Patented June 11, 1935

2,004,706

UNITED STATES PATENT OFFICE 2,004,706

PROCESS FOR THE PRODUCTION OF FERTILIZER FROM CELLULOSE MATERIALS BY BACTERIAL ACTION

Ferdinand Adolphus Nuske, East Malvern, Victoria, Australia

No Drawing. Application March 3, 1931, Serial No. 519,901. In Australia March 4, 1930

2 Claims. (Cl. 71—6)

This invention relates to a process for the production of an improved manure from cellulose materials of various kinds, for instance, from waste vegetable products such as straw, cornstalks, sawdust and the like, or the waste products from various trades such as the bagasse residue from the manufacture of cane sugar.

The object of the invention is to provide an improved manure which obviates the defects of and is superior in use to the well known inorganic artificial manures and the natural animal manures at present in common use.

The invention contemplates the inoculation or fermentation of the cellulose waste material with suitable bacteria or fungus which ferments or decomposes the material. The fermented cellulose is further inoculated with nitrogen-fixing bacteria, this micro-organism being nourished by means of a waste alkaline ferment. The latter bacteria re-acts with the nitrogen content of the air and the soil so as to produce highly efficient results in the plant nourishing properties of the soil.

In carrying out the invention cellulose containing waste products are inoculated with suitable cellulose-splitting bacteria or fungus which brings about an anaerobic fermentation. The bacteria or fungus employed may be of the genus Clostridium, Micrococcus, Boterytis, Cladosporium or the like. Preferably after the cellulose-splitting has been completed, the fermented cellulose is inoculated with the non-symbiotic genus Azotobacter or other suitable micro-organisms adapted for the production, in the soil, of nitrogenous chemical compositions highly suitable for plant nourishment. In order to provide nourishment for this latter bacteria the material is treated with a waste fermentation product such, for instance, as distillery wash which remains as a residue in the manufacture of alcohol.

According to a practical example of the invention, waste cellulose material such as hydrolyzed bagasse residue, remaining after the extraction of fermentable sugar, which is already partly destroyed in its structure, is inoculated with cellulose-splitting bacteria which bring about an anaerobic fermentation. This fermentation is quickly effected and is completed when the material attains a yellow-black coloration whereupon the material in the fermentation heap is allowed to reach a temperature of 60 to 65 degrees centigrade. The material is, at this stage, reinoculated with a nitrogen fixing bacteria, such as Azotobacter, which may be introduced in any known manner. It is then treated with the waste fermentation product thus receiving sufficient nourishment to enable it to impart to the soil the desired nitrogenous compositions adapted for plant nourishment and to prevent the destruction of the desired plant food constituents in the material. The result is to produce a bacteria which combines with the plant foods in the soil so as to produce highly efficient results in the nourishment of plant life and growth.

The addition of the nitrogen-fixing bacteria may be increased or regulated as desired by further inoculation of the fermentation heap with the bacteria or fungus whereupon the fermentation heap, in turn, is treated with an appropriate further amount of the distillery wash so as to furnish the bacteria with sufficient nourishment to maintain their vitality in the soil. When sufficient bacteria or fungus increase has taken place the fermentation process is stopped and resultant manure subjected to any suitable drying process. This drying process is so regulated that the vitality of the micro-organisms is not detrimentally affected and they thus enter with energy into the soil and serve to attract the desired nitrogen from the air as well as the soil.

The dried manure product containing the desired micro-organisms may be kept for considerable periods without deterioration. Moreover the improved product is superior to the known artificial manures in promoting soil nourishment and plant growth and is also free from the injurious and undesirable contents of animal manures. The invention also permits of the economical use of waste products as will be readily appreciated.

It is to be understood that the different bacteria or fungus employed in accordance with the invention may be introduced to the material either successively, as indicated in the example above described, or simultaneously as desired.

Having now described my invention what I claim as new and desire to secure by Letters Patent is:—

1. A process for the production of artificial manure from waste cellulose material, consisting in inoculating said material with a decomposing fungus to insure an anaerobic fermentation, permitting the fermented material to reach a temperature of approximately 60–65° C., inoculating the material with a nitrogen-fixing bacteria, and nourishing such bacteria with a waste fermentation product, as distillery wash.

2. A process for the production of an artificial manure from a waste cellulose material consisting in inoculating said material with a cellulose decomposing bacteria to insure an anaerobic fermentation, inoculating the material with a non-symbiotic genus Azotobacter, nourishing said bacteria with distillery wash, and drying the material.

FERDINAND ADOLPHUS NUSKE.